(12) United States Patent
Xu et al.

(10) Patent No.: US 10,967,476 B2
(45) Date of Patent: Apr. 6, 2021

(54) WHEEL BURR REMOVING DEVICE

(71) Applicant: CITIC Dicastal CO., LTD., Hebei (CN)

(72) Inventors: Zuo Xu, Qinhuangdao (CN); Bowen Xue, Qinhuangdao (CN); Liguo Fan, Qinhuangdao (CN); Hao Wu, Qinhuangdao (CN); Jiandong Guo, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 297 days.

(21) Appl. No.: 16/025,891

(22) Filed: Jul. 2, 2018

(65) Prior Publication Data
US 2019/0291235 A1 Sep. 26, 2019

(30) Foreign Application Priority Data
Mar. 20, 2018 (CN) .......................... 201810226690.0

(51) Int. Cl.
  *B24B 29/00* (2006.01)
  *B24B 5/44* (2006.01)

(52) U.S. Cl.
  CPC .............. *B24B 29/005* (2013.01); *B24B 5/44* (2013.01)

(58) Field of Classification Search
  CPC .... B24B 5/44; B24B 5/02; B24B 5/06; B24B 5/08; B24B 5/01; B24B 9/00; B24B 9/04; B24B 19/26; B24B 19/28; B24B 21/008; B24B 21/006; B24B 27/033; B24B 27/0023; B24B 27/0061; B24B 27/0076; B24B 29/005; B24B 29/02; B24B 29/04; B24B 29/00; B24B 41/06; B24B 41/067; B24B 47/12; B24B 47/16
  USPC .................................................... 451/65, 254
  See application file for complete search history.

(56) References Cited

U.S. PATENT DOCUMENTS

| | | | | |
|---|---|---|---|---|
| 5,042,202 A * | 8/1991 | Klein | ...................... | B24B 29/04 451/124 |
| 5,600,861 A * | 2/1997 | Saito | ..................... | A46B 13/008 15/21.1 |
| 2019/0061092 A1 | 2/2019 | Liu et al. | | |
| 2019/0193231 A1* | 6/2019 | Xue | ..................... | B24B 27/0076 |

(Continued)

FOREIGN PATENT DOCUMENTS

| CN | 205237745 U | 5/2016 |
|---|---|---|
| CN | 107414193 A | 12/2017 |

(Continued)

OTHER PUBLICATIONS

European Search Report in the European application No. 19162978.1, dated Feb. 10, 2020, 6 pgs.

*Primary Examiner* — Monica S Carter
*Assistant Examiner* — Michael A Gump
(74) *Attorney, Agent, or Firm* — Cooper Legal Group, LLC

(57) ABSTRACT

The present disclosure discloses a wheel burr removing device, consisting of a left brush system, a synchronous clamping drive system, a right brush system and the like. The wheel burr removing device can be used for removing burrs from a wheel center hole, the circumferential edge below the center hole, a bolt hole and a back cavity weight reduction pit, and at the same time, has the characteristics of high automation, high removal efficiency, advanced technology, strong universality and high safety and stability.

1 Claim, 5 Drawing Sheets

(56) References Cited

U.S. PATENT DOCUMENTS

| | | | |
|---|---|---|---|
| 2019/0283200 A1* | 9/2019 | Xue | B24B 21/006 |
| 2019/0321931 A1* | 10/2019 | Xue | B24B 27/0076 |
| 2020/0147743 A1* | 5/2020 | Zhang | B24B 47/20 |

FOREIGN PATENT DOCUMENTS

| | | | | |
|---|---|---|---|---|
| EP | 0247572 A1 * | 12/1987 | | B23P 13/02 |
| WO | WO-2017135616 A1 * | 8/2017 | | A46B 17/02 |

* cited by examiner

WHEEL BURR REMOVING DEVICE

CROSS-REFERENCE TO RELATED APPLICATION

The present application claims benefit of Chinese Patent Application No. 201810226690.0, filed on Mar. 20, 2018, the contents of which are hereby incorporated by reference in its entirety.

BACKGROUND

In the machining process of an aluminum alloy wheel, burrs are sure to produce on a wheel center hole, the circumferential edge below the center hole, a bolt hole and a back cavity weight reduction pit. If the produced burrs are not removed in time, the subsequent coating effect will be seriously affected, and even the wheel is corroded in advance during use. Therefore, a multifunctional and general-purpose automatic burr removing device is needed to remove burrs from these parts of the wheel.

SUMMARY

The present disclosure relates to a burr removing device, and specifically, to a wheel burr removing device.

The purpose of the present disclosure is to provide a wheel burr removing device, which can be used for removing burrs from a wheel center hole, the circumferential edge below the center hole, a bolt hole and a back cavity weight reduction pit.

The device consists of a frame, a lower bottom plate, a first left servo motor, a first guide rail, a left carriage, a first left rack, a first left gear, a second left rack, a second left servo motor, a second left gear, a second guide rail, a left lifting plate, first guide posts, first guide sleeves, first springs, a floating rack, a third left servo motor, a fourth left servo motor, a turnover plate, a first left shaft, a first left bearing seat, a tapered brush, an upper bottom plate, an upper gear, upper racks, a third guide rail, a left sliding plate, second left bearing seats, second left shafts, V-shaped rollers, first right shafts, first right bearing seats, a right sliding plate, a cylinder, a first right servo motor, first brush bundles, second springs, fixed blocks, third springs, fixed rings, tapered blocks, tapered heads, fourth springs, second guide posts, a sliding block, a fourth guide rail, a cylinder rod, a cylinder sleeve, a fifth spring, a piston, a second right servo motor, a second right shaft, a second brush bundle, a second right bearing seat, a third right servo motor, a right holder, a right lifting plate, a first right rack, a fifth guide rail, a second right gear, a second right rack, a fourth right servo motor, a first right gear, a right carriage, a fifth right servo motor, etc.

A left brush system includes: the lower bottom plate is fixed below the frame; the left carriage is installed above the lower bottom plate via the first guide rail; the first left rack is fixed on the left side of the left carriage; the first left servo motor is fixed below the lower bottom plate, and the first left gear is installed at the output end thereof; the first left gear is engaged with the first left rack; the left lifting plate is installed on the right side of the left carriage via the second guide rail; the second left rack is fixed on the right side of the left carriage; the second left servo motor is fixed on the right side of the left lifting plate, and the second left gear is fixed at the output end thereof; the second left gear is engaged with the second left rack; the four first guide sleeves are fixed on a top plate of the left lifting plate; the four first guide posts matched with the first guide sleeves are fixed below the floating rack; the first springs are sleeved on the first guide posts and arranged above the first guide sleeves; the third left servo motor is fixed on the side of the floating rack, and the output end thereof is connected with the side of the turnover plate; the fourth left servo motor is fixed below the turnover plate; the first left bearing seat is fixed above the turnover plate; the first left shaft is installed inside the first left bearing seat via a bearing; the output end of the fourth left servo motor is connected with the lower part of the first left shaft; and the tapered brush is fixed above the first left shaft.

A synchronous clamping drive system includes: the upper bottom plate is fixed above the frame; the upper gear is fixed in the middle above the upper bottom plate; the left sliding plate is installed above the upper bottom plate via the third guide rail; the two second left bearing seats are fixed above the left sliding plate; the two second left shafts are installed inside the second left bearing seats via bearings; the V-shaped rollers are fixed above the two second left shafts; the two first right bearing seats are fixed above the right sliding plate; the two first right shafts are installed inside the first right bearing seats via bearings; the V-shaped rollers are fixed above the two first right shafts; the first right servo motor is fixed below the right sliding plate, and the output end thereof is connected with one of the first right shafts; the cylinder is fixed on the side of the frame, and the output end thereof is connected with the right sliding plate; the two upper racks are fixed below the left sliding plate and the right sliding plate respectively, and the two upper racks are engaged with the upper gear at the same time.

A right brush system includes: a plurality of first brush bundles are installed on the side of the fixed blocks; the second springs are installed inside the fixed blocks and arranged at the bottom of each of the first brush bundles; a plurality of fixed blocks are distributed uniformly in the circumferential direction; one end of each third spring is connected with the inner side of the fixed block, and the other end is connected with the fixed ring; a plurality of tapered blocks are fixed inside the fixed blocks and arranged below the third springs; the tapered heads are arranged below the tapered blocks, and the tapered surfaces thereof are matched with the lower tapered surfaces of the tapered blocks; a plurality of second guide posts are fixed below the fixed blocks and matched with holes in the sliding block; the fourth springs are sleeved outside the second guide posts and arranged below the fixed blocks; the sliding block is installed at the upper end of an upper flat plate of the second right shaft via the fourth guide rail; the second brush bundle is installed on the side of the upper flat plate of the second right shaft; the fifth spring is arranged at the bottom of the second brush bundle; the upper end of the cylinder rod is connected with the tapered head, and the lower end is connected with the piston; the cylinder sleeve is matched with the cylinder rod and fixed at the upper center position of the second right shaft; the piston is matched with a hole in the upper center of the second right shaft; the cylinder rod, the cylinder sleeve, the piston and the hole in the upper center of the second right shaft together form a self-made cylinder; the second right shaft is installed inside the second right bearing seat via a bearing; the second right bearing seat is installed inside the right holder; the second right servo motor is fixed on the side of the right holder, and the output end thereof is connected with the second right bearing seat; the third right servo motor is fixed at the bottom of the second right bearing seat, and the output end thereof is connected with the lower part of the second right shaft; the right lifting plate is fixed below the right holder; the right lifting plate is installed on the left side of the right carriage via the fifth guide rail; the first right rack is fixed on the left side of the right carriage; the fifth right servo motor is fixed on the left side of the right lifting plate, and the first right gear is installed at the output end thereof; the first right gear is engaged with the first right rack; the fourth right servo motor is fixed at the bottom of the lower bottom plate, and the second right gear is fixed at the output end thereof; the second right rack is fixed on the right side of the right carriage; and the second right gear is engaged with the right carriage.

In the working process, the cylinder drives the upper gear, the upper rack and the four V-shaped rollers to synchronously clamp a wheel; the first right servo motor drives one of the first right shafts to rotate, so that the clamped wheel can rotate; the first left servo motor drives the tapered brush to move below a wheel bolt hole via the first left gear, the first left rack and the first guide rail; the fourth left servo motor drives the tapered brush to rotate via the first left shaft; the second left servo motor drives the tapered brush to ascend via the second left gear, the second left rack and the second guide rail, and when the rotating tapered brush contacts the wheel bolt hole, edge burrs thereon can be removed; the tapered brush rotates to a certain angle via the third left servo motor, the horizontal and vertical positions of the tapered brush are adjusted via the first left servo motor and the second left servo motor, and burrs can be removed from the weight reduction pit of the spoke back cavity; flexible floating of the tapered brush can be achieved via the first springs, the first guide posts and the first guide sleeves, to fit the deviation caused by the deformation of a spoke on the weight reduction pit; the tapered heads can ascend via the piston and the cylinder rod, and the plurality of fixing blocks and the plurality of first brush bundles can be circumferentially expanded outward under the coordination of the tapered heads and the tapered blocks to fit the center hole diameters of different wheels; vertical floating of the first brush bundles can be achieved via the fourth springs and the second guide pots; the third right servo motor can drive the first brush bundles to rotate via the second right shaft; the fourth right servo motor can drive the first brush bundles to move below the wheel center hole via the second right gear, the second right rack and the first guide rail; the fifth right servo motor can drive the first brush bundles to ascend via the first right gear, the first right rack and the fifth guide rail, and when the rotating first brush bundles contact the wheel center hole, burrs thereon can be removed; the second right servo motor can drive the second right bearing seat to turn 90 degrees so that the second brush bundle is upright, and when second brush bundle contacts the circumference below the wheel center hole, burrs thereon can be removed.

The wheel burr removing device can be used for removing burrs from a wheel center hole, the circumferential edge below the center hole, a bolt hole and a back cavity weight reduction pit, and at the same time, has the characteristics of high automation, high removal efficiency, advanced technology, strong universality and high safety and stability.

Figure 1:
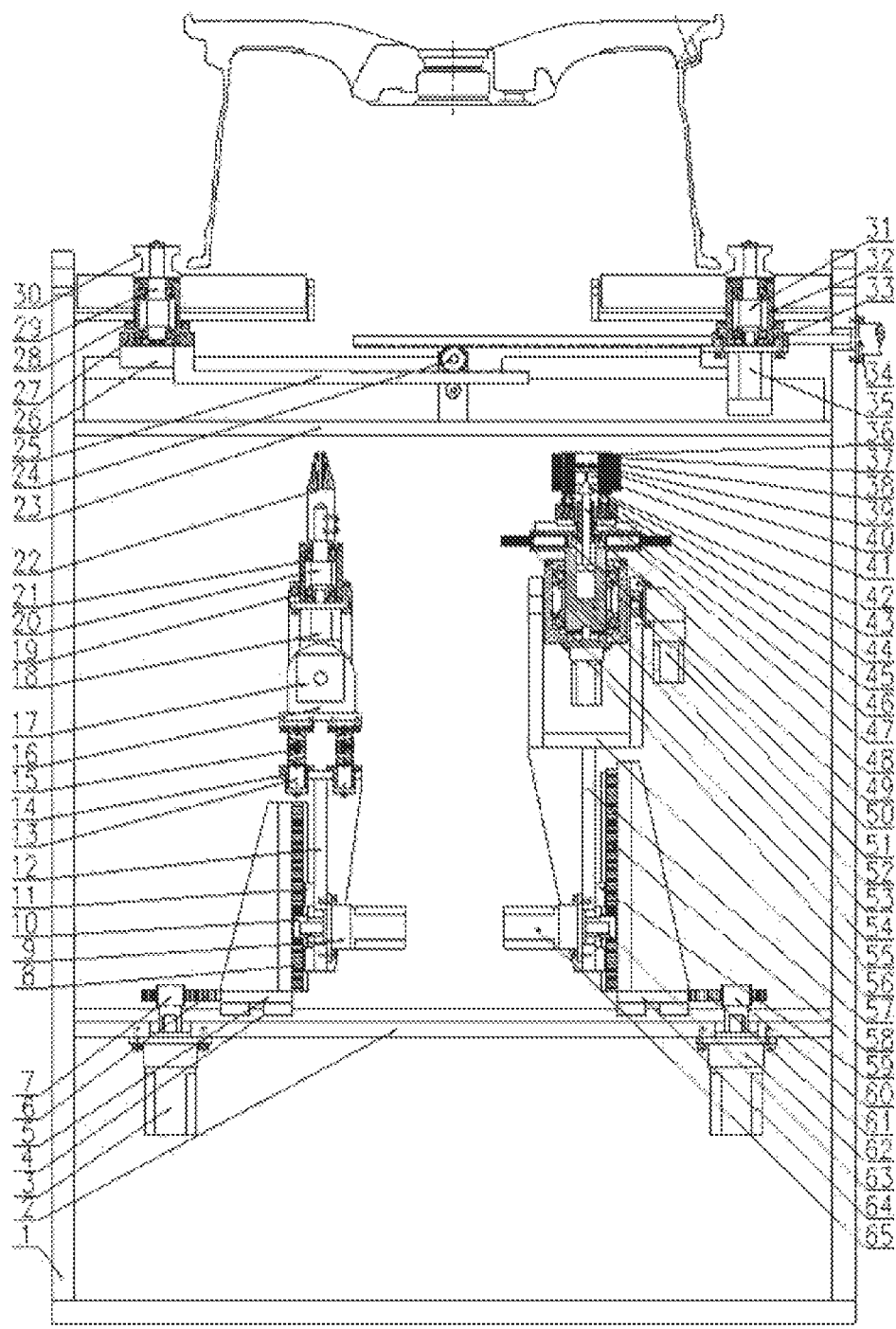
FIG. 1 is a front view of a wheel burr removing device according to the present disclosure.
Figure 2:
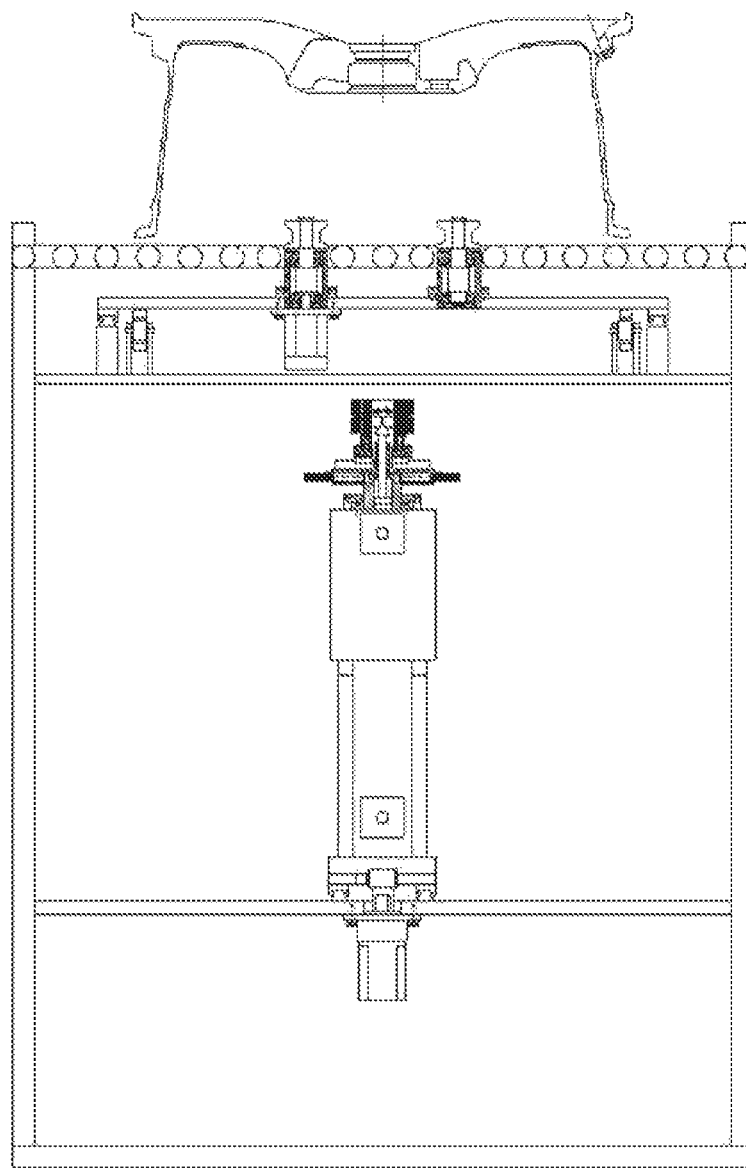
FIG. 2 is a left view of the wheel burr removing device according to the present disclosure.
Figure 3:
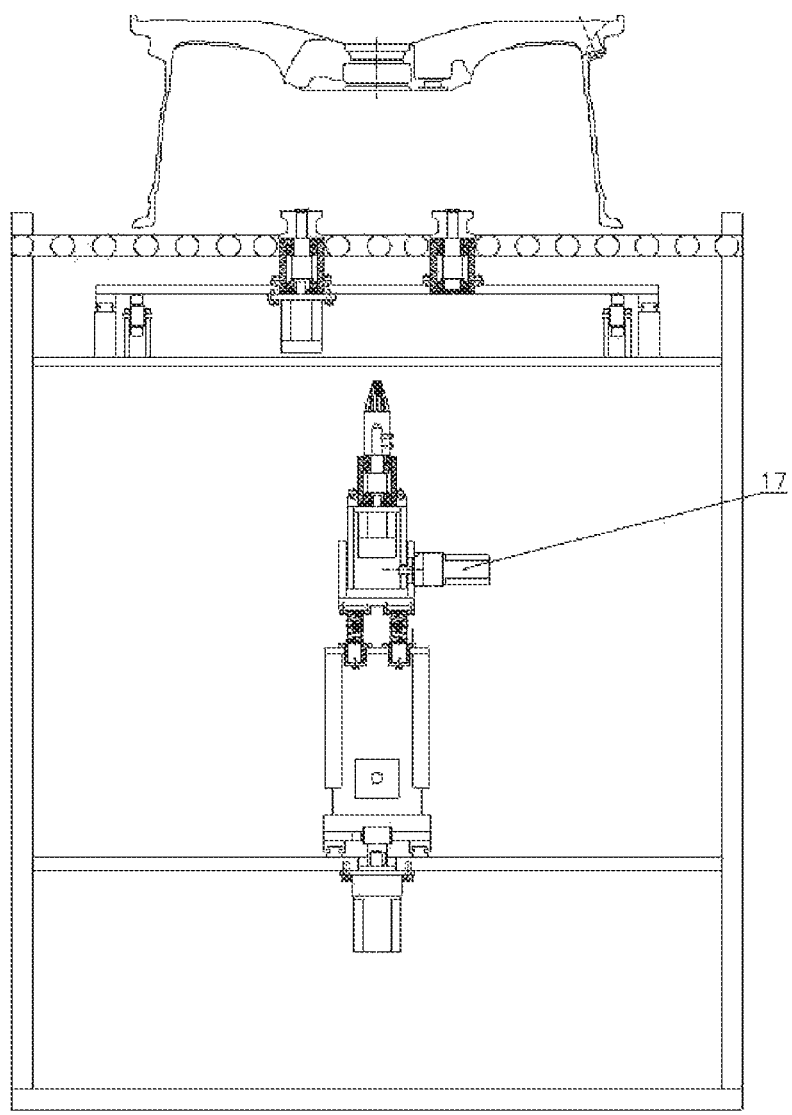
FIG. 3 is a right view of the wheel burr removing device according to the present disclosure.
Figure 4:
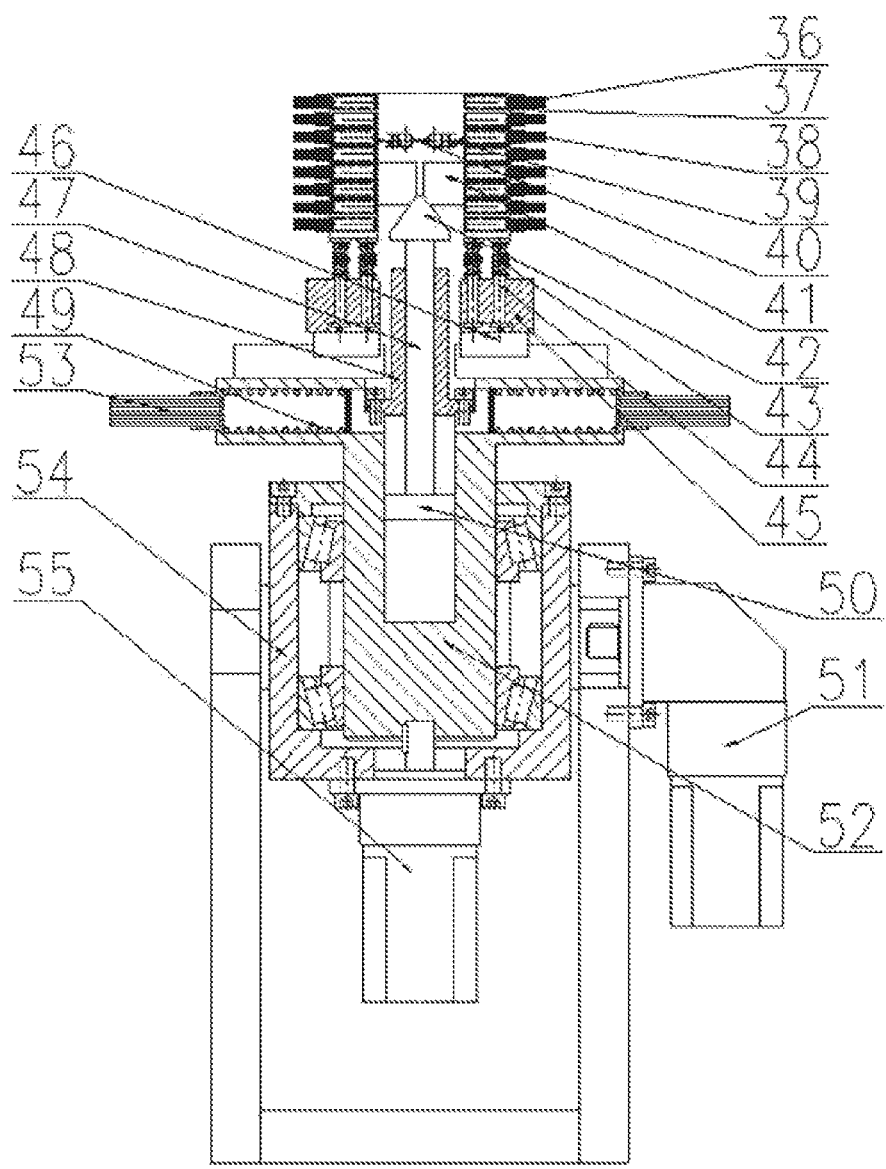
FIG. 4 is a partial front view of the wheel burr removing device according to the present disclosure, and shows a part of a left brush system in detail.
Figure 5:
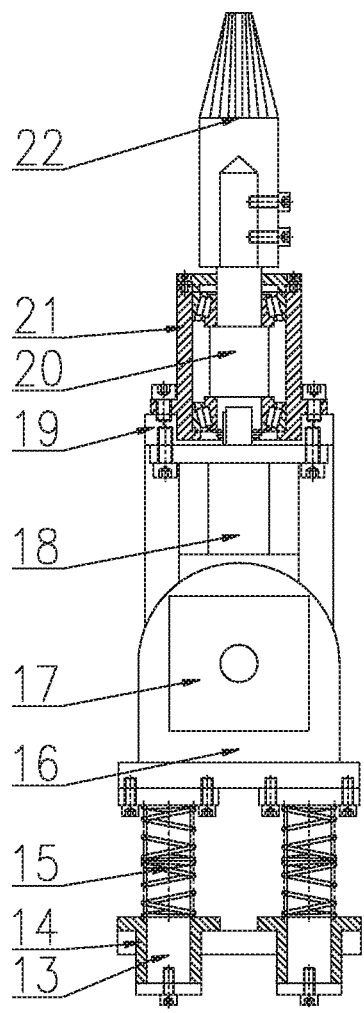
FIG. 5 is another partial front view of the wheel burr removing device according to the present disclosure, and shows a part of a right brush system in detail.

In which, 1—frame, 2—lower bottom plate, 3—first left servo motor, 4—first guide rail, 5—left carriage, 6—first left rack, 7—first left gear, 8—second left rack, 9—second left servo motor, 10—second left gear, 11—second guide rail, 12—left lifting plate, 13—first guide post, 14—first guide sleeve, 15—first spring, 16—floating rack, 17—third left servo motor, 18—fourth left servo motor, 19—turnover plate, 20—first left shaft, 21—first left bearing seat, 22—tapered brush, 23—upper bottom plate, 24—upper gear, 25—upper rack, 26—third guide rail, 27—left sliding plate, 28—second left bearing seat, 29—second left shaft, 30—V-shaped roller, 31—first right shaft, 32—first right bearing seat, 33—right sliding plate, 34—cylinder, 35—first right servo motor, 36—first brush bundle, 37—second spring, 38—fixed block, 39—third spring, 40—fixed ring, 41—tapered block, 42—tapered head, 43—fourth spring, 44—second guide post, 45—sliding block, 46—fourth guide rail, 47—cylinder rod, 48—cylinder sleeve, 49—fifth spring, 50—piston, 51—second right servo motor, 52—second right shaft, 53—second brush bundle, 54—second right bearing seat, 55—third right servo motor, 56—right holder, 57—right lifting plate, 58—first right rack, 59—fifth guide rail, 60—second right gear, 61—second right rack, 62—fourth right servo motor, 63—first right gear, 64—right carriage, 65—fifth right servo motor.

DETAILED DESCRIPTION

The details and working conditions of the specific device according to the present disclosure will be described below in combination with the drawings.

The device consists of a frame 1, a lower bottom plate 2, a first left servo motor 3, a first guide rail 4, a left carriage 5, a first left rack 6, a first left gear 7, a second left rack 8, a second left servo motor 9, a second left gear 10, a second guide rail 11, a left lifting plate 12, first guide posts 13, first guide sleeves 14, first springs 15, a floating rack 16, a third left servo motor 17, a fourth left servo motor 18, a turnover plate 19, a first left shaft 20, a first left bearing seat 21, a tapered brush 22, an upper bottom plate 23, an upper gear 24, upper racks 25, a third guide rail 26, a left sliding plate 27, second left bearing seats 28, second left shafts 29, V-shaped rollers 30, first right shafts 31, first right bearing seats 32, a right sliding plate 33, a cylinder 34, a first right servo motor 35, first brush bundles 36, second springs 37, fixed blocks 38, third springs 39, fixed rings 40, tapered blocks 41, tapered heads 42, fourth springs 43, second guide posts 44, a sliding block 45, a fourth guide rail 46, a cylinder rod 47, a cylinder sleeve 48, a fifth spring 49, a piston 50, a second right servo motor 51, a second right shaft 52, a second brush bundle 53, a second right bearing seat 54, a third right servo motor 55, a right holder 56, a right lifting plate 57, a first right rack 58, a fifth guide rail 59, a second right gear 60, a second right rack 61, a fourth right servo motor 62, a first right gear 63, a right carriage 64, a fifth right servo motor 65, etc.

A left brush system includes: the lower bottom plate 2 is fixed below the frame 1; the left carriage 5 is installed above the lower bottom plate 2 via the first guide rail 4; the first left rack 6 is fixed on the left side of the left carriage 5; the first left servo motor 3 is fixed below the lower bottom plate 2, and the first left gear 7 is installed at the output end thereof; the first left gear 7 is engaged with the first left rack 6; the left lifting plate 12 is installed on the right side of the left carriage 5 via the second guide rail 11; the second left rack 8 is fixed on the right side of the left carriage 5; the second left servo motor 9 is fixed on the right side of the left lifting plate 12, and the second left gear 10 is fixed at the output end thereof; the second left gear 10 is engaged with the second left rack 8; the four first guide sleeves 14 are fixed on a top plate of the left lifting plate 12; the four first guide posts 13 matched with the first guide sleeves 14 are fixed below the floating rack 16; the first springs 15 are sleeved on the first guide posts 13 and arranged above the first guide sleeves 14; the third left servo motor 17 is fixed on the side of the floating rack 16, and the output end thereof is connected with the side of the turnover plate 19; the fourth left servo motor 18 is fixed below the turnover plate 19; the first left bearing seat 21 is fixed above the turnover plate 19; the first left shaft 20 is installed inside the first left bearing seat 21 via a bearing; the output end of the fourth left servo motor 18 is connected with the lower part of the first left shaft 20; and the tapered brush 22 is fixed above the first left shaft 20.

A synchronous clamping drive system includes: the upper bottom plate 23 is fixed above the frame 1; the upper gear 24 is fixed in the middle above the upper bottom plate 23; the left sliding plate 27 is installed above the upper bottom plate 23 via the third guide rail 26; the two second left bearing seats 28 are fixed above the left sliding plate 27; the two second left shafts 29 are installed inside the second left bearing seats 28 via bearings; the V-shaped rollers 30 are fixed above the two second left shafts 29; the two first right bearing seats 32 are fixed above the right sliding plate 33; the two first right shafts 31 are installed inside the first right bearing seats 32 via bearings; the V-shaped rollers 30 are fixed above the two first right shafts 31; the first right servo motor 35 is fixed below the right sliding plate 33, and the output end thereof is connected with one of the first right shafts 31; the cylinder 34 is fixed on the side of the frame 1, and the output end thereof is connected with the right sliding plate 33; the two upper racks 25 are fixed below the left sliding plate 27 and the right sliding plate 33 respectively, and the two upper racks 25 are engaged with the upper gear 24 at the same time.

A right brush system includes: a plurality of first brush bundles 36 are installed on the side of the fixed blocks 38; the second springs 37 are installed inside the fixed blocks 38 and arranged at the bottom of each of the first brush bundles 36; a plurality of fixed blocks 38 are distributed uniformly in the circumferential direction; one end of each third spring 39 is connected with the inner side of the fixed block 38, and the other end is connected with the fixed ring 40; a plurality of tapered blocks 41 are fixed inside the fixed blocks 38 and arranged below the third springs 39; the tapered heads 42 are arranged below the tapered blocks 41, and the tapered surfaces thereof are matched with the lower tapered surfaces of the tapered blocks 41; a plurality of second guide posts 44 are fixed below the fixed blocks 38 and matched with holes in the sliding block 45; the fourth springs 43 are sleeved outside the second guide posts 44 and arranged below the fixed blocks 38; the sliding block 45 is installed at the upper end of an upper flat plate of the second right shaft 52 via the fourth guide rail 46; the second brush bundle 53 is installed on the side of the upper flat plate of the second right shaft 52; the fifth spring 49 is arranged at the bottom of the second brush bundle 53; the upper end of the cylinder rod 47 is connected with the tapered head 42, and the lower end is connected with the piston 50; the cylinder sleeve 48 is matched with the cylinder rod 47 and fixed at the upper center position of the second right shaft 52; the piston 50 is matched with a hole in the upper center of the second right shaft 52; the cylinder rod 47, the cylinder sleeve 48, the piston 50 and the hole in the upper center of the second right shaft 52 together form a self-made cylinder; the second right shaft 52 is installed inside the second right bearing seat 54 via a bearing; the second right bearing seat 54 is installed inside the right holder 56; the second right servo motor 51 is fixed on the side of the right holder 56, and the output end thereof is connected with the second right bearing seat 54; the third right servo motor 55 is fixed at the bottom of the second right bearing seat 54, and the output end thereof is connected with the lower part of the second right shaft 52; the right lifting plate 57 is fixed below the right holder 56; the right lifting plate 57 is installed on the left side of the right carriage 64 via the fifth guide rail 59; the first right rack 58 is fixed on the left side of the right carriage 64; the fifth right servo motor 65 is fixed on the left side of the right lifting plate 57, and the first right gear 63 is installed at the output end thereof; the first right gear 63 is engaged with the first right rack 58; the fourth right servo motor 62 is fixed at the bottom of the lower bottom plate 2, and the second right gear 60 is fixed at the output end thereof; the second right rack 61 is fixed on the right side of the right carriage 64; and the second right gear 60 is engaged with the right carriage 64.

In the working process, the cylinder 34 drives the upper gear 24, the upper rack 25 and the four V-shaped rollers 30 to synchronously clamp a wheel; the first right servo motor 35 drives one of the first right shafts 31 to rotate, so that the clamped wheel can rotate; the first left servo motor 3 drives the tapered brush 22 to move below a wheel bolt hole via the first left gear 7, the first left rack 6 and the first guide rail 4; the fourth left servo motor 18 drives the tapered brush 22 to rotate via the first left shaft 20; the second left servo motor 9 drives the tapered brush 22 to ascend via the second left gear 10, the second left rack 8 and the second guide rail 11, and when the rotating tapered brush 22 contacts the wheel bolt hole, edge burrs thereon can be removed; the tapered brush 22 rotates to certain angle via the third left servo motor 17, the horizontal and vertical positions of the tapered brush 22 are adjusted via the first left servo motor 3 and the second left servo motor 9, and burrs can be removed from the weight reduction pit of the spoke back cavity; flexible floating of the tapered brush 22 can be achieved via the first springs 15, the first guide posts 13 and the first guide sleeves 14, to fit the deviation caused by the deformation of a spoke on the weight reduction pit; the tapered heads 42 can ascend via the piston 50 and the cylinder rod 47, and the plurality of fixing blocks 38 and the plurality of first brush bundles 36 can be circumferentially expanded outward under the coordination of the tapered heads 42 and the tapered blocks 41 to fit the center hole diameters of different wheels; vertical floating of the first brush bundles 36 can be achieved via the fourth springs 43 and the second guide pots 44; the third right servo motor 55 can drive the first brush bundles 36 to rotate via the second right shaft 52; the fourth right servo motor 62 can drive the first brush bundles 36 to move below the wheel center hole via the second right gear 60, the second right rack 61 and the first guide rail 4; the fifth right servo motor 65 can drive the first brush bundles 36 to ascend via the first right gear 63, the first right rack 58 and the fifth guide rail 59, and when the rotating first brush bundles 36 contact the wheel center hole, burrs thereon can be removed; the second right servo motor 51 can drive the second right bearing seat 54 to turn 90 degrees so that the second brush bundle 53 is upright, and when second brush bundle 53 contacts the circumference below the wheel center hole, burrs thereon can be removed.

The invention claimed is:

1. A wheel burr removing device, comprising a left brush system, a synchronous clamping drive system, and a right brush system, wherein:

in the left brush system a lower bottom plate is fixed below a frame; a left carriage is installed above the lower bottom plate via a first guide rail; a first left rack is fixed on a left side of the left carriage; a first left servo motor is fixed below the lower bottom plate, and a first left gear is installed at an output end of the first left servo motor thereof; the first left gear is engaged with the first left rack; a left lifting plate is installed on a right side of the left carriage via a second guide rail; a second left rack is fixed on the right side of the left carriage; a second left servo motor is fixed on a right side of the left lifting plate, and a second left gear is fixed at an output end of the second left servo motor; the second left gear is engaged with the second left rack; four first guide sleeves are fixed on a top plate of the left lifting plate; four first guide posts are fixed below a floating rack, each of the four first guide posts are matched with a respective one of the four first guide sleeves; four first springs are provided, each of the four first springs is sleeved on a respective one of the four first guide posts and arranged above a respective one of the four first guide sleeves; a third left servo motor is fixed on a side of the floating rack, and an output end of the third left servo motor is connected with a side of a turnover plate; a fourth left servo motor is fixed below the turnover plate; a first left bearing seat is fixed above the turnover plate; a first left shaft is installed inside the first left bearing seat via a first bearing; an output end of the fourth left servo motor is connected with a lower part of the first left shaft; and a tapered brush is fixed above the first left shaft;

in the synchronous clamping drive system: an upper bottom plate is fixed above the frame; an upper gear is fixed in a middle above the upper bottom plate; a left sliding plate is installed above the upper bottom plate via a third guide rail; the two second left bearing seats are fixed above the left sliding plate; two second left shafts are provided, each of the two second left shafts is installed inside a respective one of the two second left bearing seats via a second bearings; two V shaped rollers are provided, and one of the two V-shaped rollers is fixed above the two second left shafts; two first right bearing seats are fixed above a right sliding plate; two first right shafts are provided, each of the two first right shafts is installed inside a respective one of the two first right bearing seats via a third bearings; the other one of the two V-shaped rollers is fixed above the two first right shafts; a first right servo motor is fixed below the right sliding plate, and an output end of the first right servo motor is connected with one of the two first right shafts; a cylinder is fixed on a side of the frame, and an output end of the cylinder is connected with the right sliding plate; two upper racks are fixed below the left sliding plate and the right sliding plate respectively, and the two upper racks are engaged with the upper gear at the same time; and in the right brush system: a plurality of first brush bundles are provided, each of the first brush bundles is installed on a side of respective one of a plurality of fixed blocks; a plurality of second springs are provided, each of the second springs is installed inside a respective one of the fixed blocks and arranged at a bottom of a respective one of the first brush bundles; the fixed blocks are distributed uniformly in a circumferential direction; two third springs are provided, one end of one of the two third springs is connected with an inner side of one of the fixed blocks and the other end of the one of the two third springs is connected with a fixed ring, one end of another one of the two third springs is connected with an inner side of another one of the fixed blocks opposite to the one of the fixed blocks and the other end of the another one of the two third springs is connected with the fixed ring; two tapered blocks are fixed inside the respective fixed blocks and arranged below the two third springs; a tapered heads is arranged below the two tapered blocks, and a tapered surface of the tapered head is matched with a lower tapered surfaces of each of the two tapered blocks; four second guide posts are fixed below the fixed blocks, and each of the four second guide posts is matched with a respective one of four holes in a sliding block four fourth springs are provided, each of the four fourth springs is sleeved outside a respective one of the four second guide posts and arranged below the fixed blocks; the sliding block is installed at an upper end of an upper flat plate of a second right shaft via a fourth guide rail; four second brush bundles are installed on a side of the upper flat plate of the second right shaft; four fifth springs are arranged at a bottom of the four second brush bundles; an upper end of a cylinder rod is connected with the tapered head, and a lower end of the cylinder rod is connected with a piston; a cylinder sleeve is matched with the cylinder rod and fixed at an upper center position of the second right shaft; the piston is matched with a hole in the upper center of the second right shaft; the cylinder rod, the cylinder sleeve, the piston and the hole in the upper center of the second right shaft together form a self-made cylinder; the second right shaft is installed inside a second right bearing seat via a fourth bearing; the second right bearing seat is installed inside a right holder; a second right servo motor is fixed on a side of the right holder, and an output end of the second right servo motor is connected with the second right bearing seat; a third right servo motor is fixed at a bottom of the second right bearing seat, and an output end of the third right servo motor is connected with a lower part of the second right shaft; a right lifting plate is fixed below the right holder; the right lifting plate is installed on a left side of a right carriage via a fifth guide rail; a first right rack is fixed on the left side of the right carriage; a fifth right servo motor is fixed on a left side of the right lifting plate, and a first right gear is installed at the output end of the fifth right servo motor; the first right gear is engaged with the first right rack; a fourth right servo motor is fixed at a bottom of the lower bottom plate, and a second right gear is fixed at an output end of the fourth right servo motor; a second right rack is fixed on a right side of the right carriage; and the second right gear is engaged with the right carriage.

* * * * *